(12) United States Patent
Kesho et al.

(10) Patent No.: US 9,134,578 B2
(45) Date of Patent: Sep. 15, 2015

(54) LIQUID CRYSTAL DISPLAY DEVICE

(71) Applicant: Japan Display Inc., Minato-ku (JP)

(72) Inventors: Masato Kesho, Tokyo (JP); Kazuhiro Takahashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/138,346

(22) Filed: Dec. 23, 2013

(65) Prior Publication Data

US 2014/0198276 A1 Jul. 17, 2014

(30) Foreign Application Priority Data

Jan. 15, 2013 (JP) ................... 2013-004724

(51) Int. Cl.
*G02F 1/1343* (2006.01)
*G02F 1/1362* (2006.01)

(52) U.S. Cl.
CPC .... *G02F 1/134336* (2013.01); *G02F 1/136286* (2013.01); *G02F 2001/134318* (2013.01); *G02F 2001/136218* (2013.01)

(58) Field of Classification Search
CPC ............... G02F 1/134363; G02F 2001/134381
USPC ........................................................ 349/141
See application file for complete search history.

(56) References Cited

U.S. PATENT DOCUMENTS

| | | | |
|---|---|---|---|
| 6,266,116 B1 | 7/2001 | Ohta et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0002126 A1* | 1/2008 | Lim et al. | 349/141 |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1* | 8/2008 | Kwon et al. | 349/139 |
| 2012/0249941 A1* | 10/2012 | Yamamoto et al. | 349/123 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 5/2005 |
| JP | 2005-242307 | 9/2005 |

* cited by examiner

*Primary Examiner* — Thanh-Nhan P Nguyen

(74) *Attorney, Agent, or Firm* — Oblon, McClelland, Maier & Neustadt, L.L.P.

(57) ABSTRACT

An insulating film is arranged between a gate line and a gate shield electrode. A concave portion which extends in a first direction along with the edges of the gate line is formed in the insulating film. The concave portion in a slit shape is formed along with the edges of both sides of the gate line, respectively. The gate shield electrode extends to the concave portion.

10 Claims, 8 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2013-4724, filed Jan. 15, 2013, the entire contents of which are incorporated herein by reference.

FIELD

Embodiments described herein relate generally to a liquid crystal display device.

BACKGROUND

In recent years, a flat panel display device is developed briskly. Especially, the liquid crystal display device gets a lot of attention from advantages, such as light weight, thin shape, and low power consumption. In an active-matrix type liquid crystal display device equipped with a switching element in each pixel, a structure using lateral electric field, such as IPS (In-Plane Switching) mode and FFS (Fringe Field Switching) mode, attracts attention.

The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate. As one example, a technique to control generation of display defect due to impression of undesired bias to the liquid crystal layer from a gate line is proposed by arranging a sub-electrode, i.e., a portion of a pixel electrode, on the gate line.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

FIGS. 3B and 3C are figures showing alignment axes.

DETAILED DESCRIPTION

Figure 1:
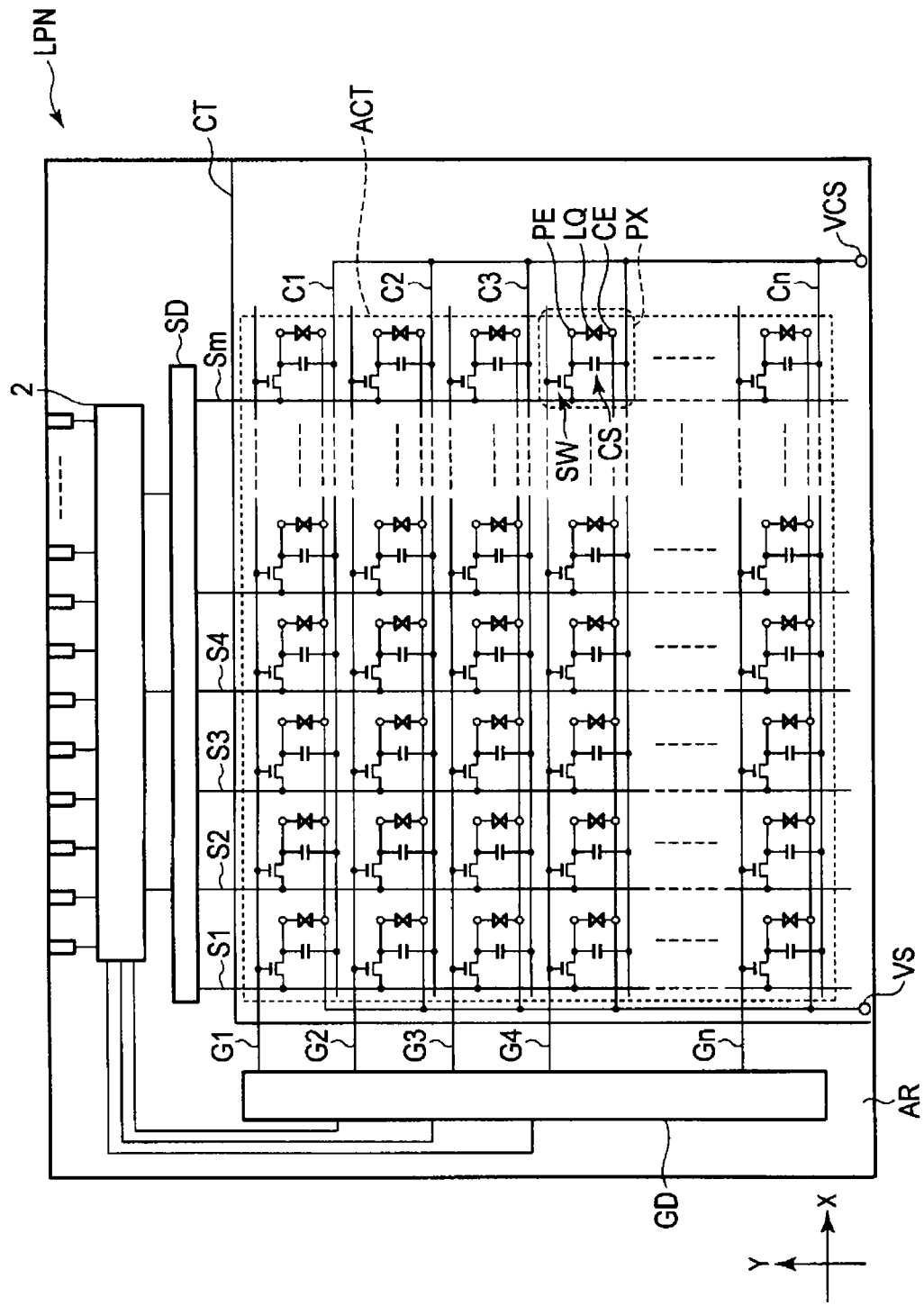
FIG. 1 is a figure schematically showing a structure and an equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a gate line extending in a first direction, a first insulating film covering the gate line, a source line arranged on the first insulating film and extending in a second direction crossing the first direction, a switching element electrically connected with the gate line and the source line, a second insulating film covering the source line and the switching element and arranged on the first insulating film, a third insulating film arranged on the second insulating film and including a concave portion extending along an edge of the gate line in the first direction, a pixel electrode located on the third insulating film, and including a contact portion contacting with the switching element extending in the first direction and a main pixel electrode connected with the contact portion and extending in the second direction, a gate shield electrode arranged on the third insulating film above the gate line and extending to the concave portion, the gate shield electrode extending in the first direction, and a source shield electrode electrically connected with the gate shield electrode on the third insulating film and arranged above the source line so as to extend in the second direction; a second substrate including a common electrode with same potential as the gate shield electrode and the source shield electrode, the common electrode being provided with a sub-common electrode located above the gate shield layer and extending in the first direction, and a main-common electrode connected with the sub-common electrode and arranged above the source shield electrode so as to extend in the second direction; and a liquid crystal layer held between the first substrate and the second substrate.

FIG. 1 is a figure schematically showing a structure and an equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is formed of a plurality of pixels PX.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in a first direction X, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source line S may not necessarily extend linearly, and a portion thereof may be crooked partly or widened.

Each gate line G is pulled out to outside of the active area ACT, and connected to a gate driver GD. Each source line S is pulled out to the outside of the active area ACT, and connected to a source driver SD. While the gate driver GD and the source driver SD are connected with a driver IC chip 2 provided in the array substrate AR, they may be implemented in the driver IC chip 2.

Each pixel PX includes a switching element SW, a pixel electrode PE, a common electrode CE, etc. Retention capacitance Cs is formed, for example, between the auxiliary capacitance line C and the pixel electrode PE (or drain electrode with the same potential as the pixel electrode). The auxiliary capacitance line C is electrically connected with a voltage impressing portion VCS to which auxiliary capacitance voltage is impressed.

In the liquid crystal display panel LPN, while the pixel electrode PE is formed in the array substrate AR, at least a portion of the common electrodes CE is formed in the counter substrate CT. The liquid crystal molecules of the liquid crystal layer LQ are switched mainly using electric field formed between the pixel electrodes PE and the common electrodes CE. The electric field formed between the pixel electrode PE and the common electrode CE is oblique electric field (or horizontal electric field) slightly oblique with respect to the X-Y plane specified in the first direction X and the second direction Y.

The switching element SW is formed by an "n" channel type thin film transistor (TFT), for example. The switching element SW is electrically connected with the gate line G and the source line S. The pixel electrode PE is electrically connected with the switching element SW. The common electrode CE is arranged in common to the pixel electrodes PE of a plurality of pixels PX through the liquid crystal layer LQ. Although the pixel electrode PE and the common electrode CE are formed of transparent electric conductive materials, such as Indium Tin Oxide (ITO) and Indium Zinc Oxide (IZO), for example, the electrodes may be formed of opaque wiring materials, such as aluminum (aluminum), titanium (Ti), silver (Ag), molybdenum (Mo), tungsten (W), and chromium (Cr).

The array substrate AR is equipped with an electric power supply portion VS for impressing voltage to the common electrode CE. The electric power supply portion VS is formed in the outside of the active area ACT, for example. The common electrode CE in the counter substrate CT is pulled out to the outside of the active area ACT, and electrically connected with the electric power supply portion VS through an electric conductive component which is not illustrated.

Figure 2:
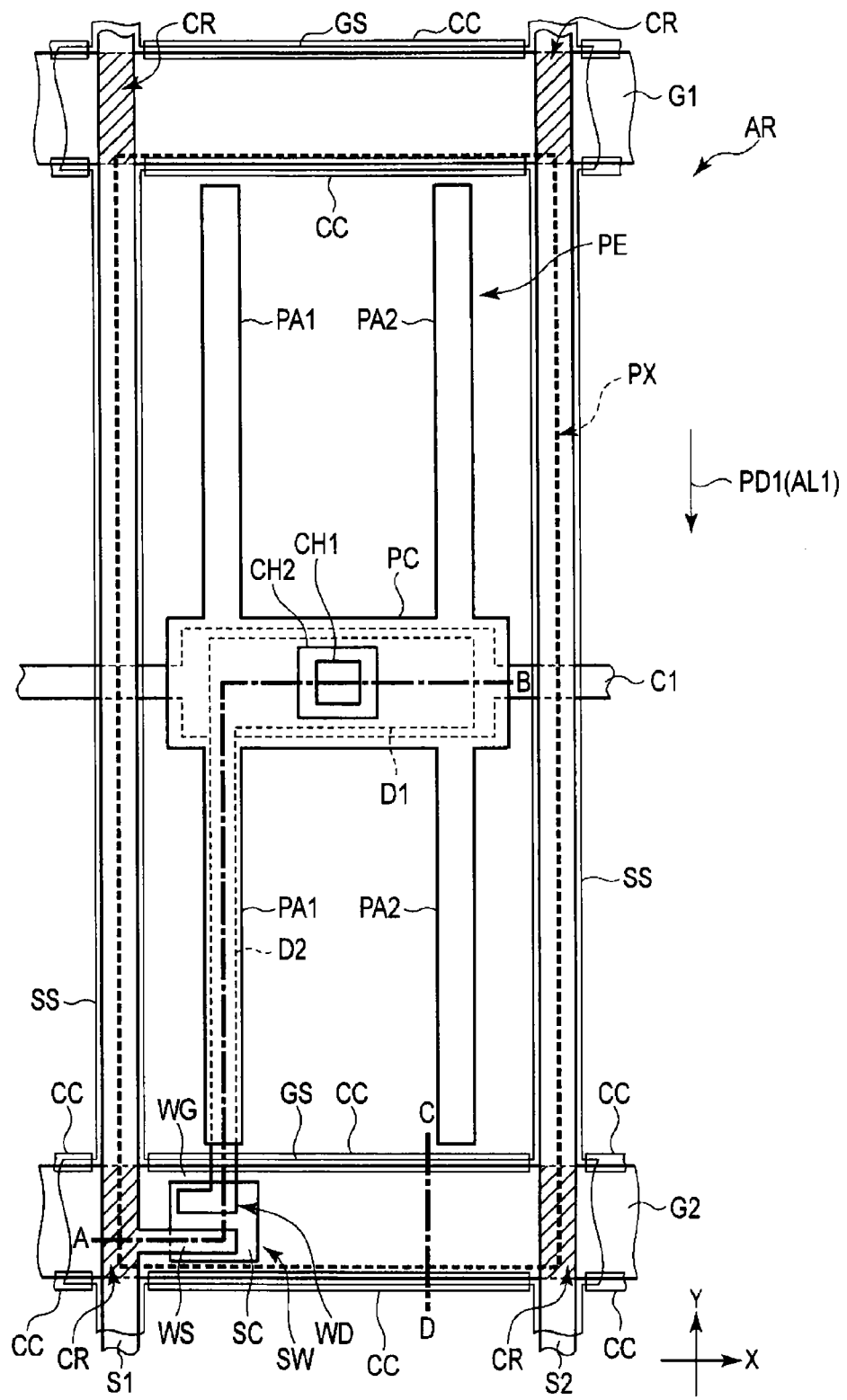
FIG. 2 is a plan view schematically showing a structure of one pixel when an array substrate shown in FIG. 1 is seen from a counter substrate side according to a first embodiment.

FIG. 2 is a plan view schematically showing a structure of one pixel in a X-Y plane when the array substrate AR shown in FIG. 1 is seen from a counter substrate side according to the embodiment.

The array substrate AR is equipped with a gate line G1, a gate line G2, an auxiliary capacitance line C1, a source line S1, a source line S2, a switching element SW, a pixel electrode PE, a gate shield electrode GS, a source shield electrode SS, and a first alignment film AL1, etc.

In this embodiment, the pixel PX has a longwise shape of a rectangle whose length in the first direction X is shorter than the length in the second direction Y, as shown in a dashed line. The gate line G1 and gate line G2 extend along the first direction X, respectively. The auxiliary capacitance line C1 is located between the gate line G1 and the gate line G2, and extend along the first direction X. The source line S1 and source line S2 extend along the second direction Y, respectively.

In illustrated pixel PX, a gate line G1 is arranged at an upper portion end, and a gate line G2 is arranged at a bottom end portion. Strictly, the gate line G1 is arranged striding over a boundary between the illustrated pixel PX and a pixel PX adjoining its upper portion. The gate line G2 is arranged striding over a boundary between the illustrated pixel PX and a pixel PX adjoining its bottom portion. That is, the length of the pixel PX in the second direction Y corresponds to a first pitch between the adjoining gate line G1 and the gate line G2 in the second direction Y. The source line S1 is arranged at the left-hand side end, and the source line S2 is arranged at the right-hand side end. Strictly, the source line S1 is arranged striding over a boundary between the illustrated pixel PX and a pixel adjoining its left-hand side, and the source line S2 is arranged striding over a boundary between the illustrated pixel PX and a pixel PX adjoining its right-hand side. That is, the length of the pixel PX in the first direction X corresponds to a second pitch between the adjacent source lines S1 and S2 in the first direction X. The second pitch is smaller than the first pitch. The auxiliary capacitance line C1 is located in the middle between the gate line G2 and the gate line G1. That is, the interval between the auxiliary capacitance line C1 and the gate line G1 in the second direction Y is the same as the interval between the auxiliary capacitance line C1 and the gate line G2 in the second direction Y.

The switching element SW is electrically connected with the gate line G2 and the source line S1 in this embodiment. The switching element SW includes a gate electrode WG which is a portion of the gate line G2, a semiconductor layer SC formed of an amorphous silicon and located on the gate electrode WG, a source electrode WS connected with the source line S1 and in contact with the semiconductor layer SC, and a drain electrode WD in contact with the semiconductor layer SC.

The drain electrode WD is located between the source line S1 and the source line S2, and apart from the source line S1 and the source line S2. The drain electrode WD is equipped with a first electrode portion D1 and a second electrode portion D2. The first and second electrode portions D1 and D2 are formed in the shape of a linear stripe. The first electrode portion D1 extends in the first direction X. The second electrode portion D2 extends in the second direction Y. The first electrode portion D1 and the second electrode portion D2 are integrally or continuously formed, and electrically connected mutually. The above drain electrode WD is formed substantially in the shape of "L".

The first electrode portion D1 is located above the auxiliary capacitance line C1 substantially in the central portion of the pixel PX. Moreover, the first electrode portion D1 is located under a contact portion PC of the pixel electrode PE to be mentioned later. In addition, a tip portion of the second electrode portion D2 is crooked at a substantially right angle, and in contact with the semiconductor layer SC. The second electrode portion D2 extends in the shape of a straight line in the second direction Y from a position where the second electrode portions D2 is in contact with the semiconductor layer SC toward the first electrode portion D1, and is connected with the first electrode portions D1. The second electrode portion D2 is located under the main pixel electrode PA1 of the pixel electrode PE mentioned to be later, and extends in parallel with a main pixel electrode PA1.

The pixel electrode PE is located in an inner side surrounded by the source line S1 and the source line S2, and the gate line G1 and the gate line G2. The pixel electrode PE is equipped with the main pixel electrode PA1, the main pixel electrode PA2, and the contact portion PC. The main pixel electrode PA1, the main pixel electrode PA2, and the contact portion PC are integrally or continuously formed, and electrically connected mutually.

The contact portion PC is in contact with the switching element SW. The contact portion PC is located substantially in the central portion of the pixel PX, and extends along the first direction X. The contact portion PC is located right above the drain electrode WD. The contact portion PC is electrically connected with the first electrode portion D1 of the drain electrode WD through a contact hole CH1 and a contact hole CH2. In addition, the contact hole CH2 is formed so that the contact hole CH2 becomes bigger size than the contact hole CH1.

The main pixel electrode PA1 and the main pixel electrode PA2 are connected with the contact portion PC, respectively, and extend in the second direction Y toward the gate line G1 and the gate line G2 from the contact portion PC. The main pixel electrode PA1 is located on the source line S1 side rather than a contact position with the drain electrode WD, and located above the second electrode portion D2. The main pixel electrode PA2 is located on the source line S2 side rather than the contact position with the drain electrode WD, and located above the third electrode portion D3. The above pixel electrode PE has a substantially "H" shape.

In this embodiment, the first electrode portion D1 and the contact portion PC are formed in the shape of a stripe with a constant width in the second direction Y respectively, and the contact portion PC is formed in the shape of a stripe with a larger width than the first electrode portion D 1. The second electrode portion D2 and the main pixel electrode PA1 are formed in the shape of a stripe with a constant width in the first direction X respectively, and the main pixel electrode PA1 is formed with a larger width than the second electrode portion D2. That is, in the X-Y plane, the first electrode portion D1 and the second electrode portion D2 of the drain electrode WD are covered with the contact portion PC and the main pixel electrode PA1 of the pixel electrode PE, and do not protrude from the pixel electrode PE.

The gate shield electrode GS is located above the gate line G1 and the gate line G2, i.e., the gate shield electrode GS is located right above the gate line G1 and the gate line G2, respectively. The gate shield electrode GS extends in the first direction X, and is formed in a stripe shape. The gate shield electrode GS, the gate line G1, and the gate line G2 are formed in the shape of a stripe which has the constant width in the second direction Y, respectively. The gate shield electrode GS is formed more broadly than the gate line G1 and the gate line G2. In the X-Y plane, the gate line G1 and the gate line G2 are covered with the gate shield electrode GS, and do not protrude from the gate shield electrode GS. The gate shield electrode GS is pulled out to the outside of the active area ACT, and electrically connected with the electric supply portion VS, for example.

An interlayer insulating film to be mentioned later is arranged between the gate lines G1, G2 and the gate shield electrode GS. A concave portion CC which extends in the first direction X along with the edges of the gate line G1 and the gate line G2 is formed in the interlayer insulating film. In this embodiment, the concave portion CC in a slit shape is formed along with the edges of both sides of the gate line G2, respectively. Similarly, in the gate line G1, the concave portion CC in the shape of a slit is formed along with the edges of both sides, respectively. Although the concave portion CC is broken off at an intersection portion CR where the gate line G and source line S intersect, the concave portion CC does not necessarily need to be broken off, and may be formed continuously over the plurality of pixels. The gate shield electrode GS extends to the concave portion CC.

The source shield electrode SS is located above the source lineS1 and the source line S2, i.e., the source shield electrode SS is located right above the source line S1 and the source line S2. The source shield electrode SS extends in the second direction Y, and is formed in a stripe shape. The source shield electrode SS, the source line S1, and the source line S2 are formed in the shape of a stripe which has substantially constant width in the first direction X, respectively, and the source shield electrode SS is formed more broadly than the source line S1 and the source line S2. In the X-Y plane, the source line S1 and the source line S2 are covered with the source shield electrode SS, and do not protrude from the source shield electrode SS. The source shield electrode SS is connected with the gate shield electrode GS. That is, the gate shield electrode GS and the source shield electrode SS are formed integrally or continuously, and make the shape of a lattice. In addition, the width of the gate shield electrode GS and the source shield electrode SS may not be constant necessarily.

The first alignment film AL1 covers the pixel electrode PE, the gate shield electrode GS, and the source shield electrode SS. In order to initially align the liquid crystal molecule of the liquid crystal layer LQ, initial alignment treatment is made to the first alignment film AL1 along with a first alignment treatment direction PD1. The first alignment treatment direction PD1 is in parallel to the second direction Y, for example.

Figure 3A:
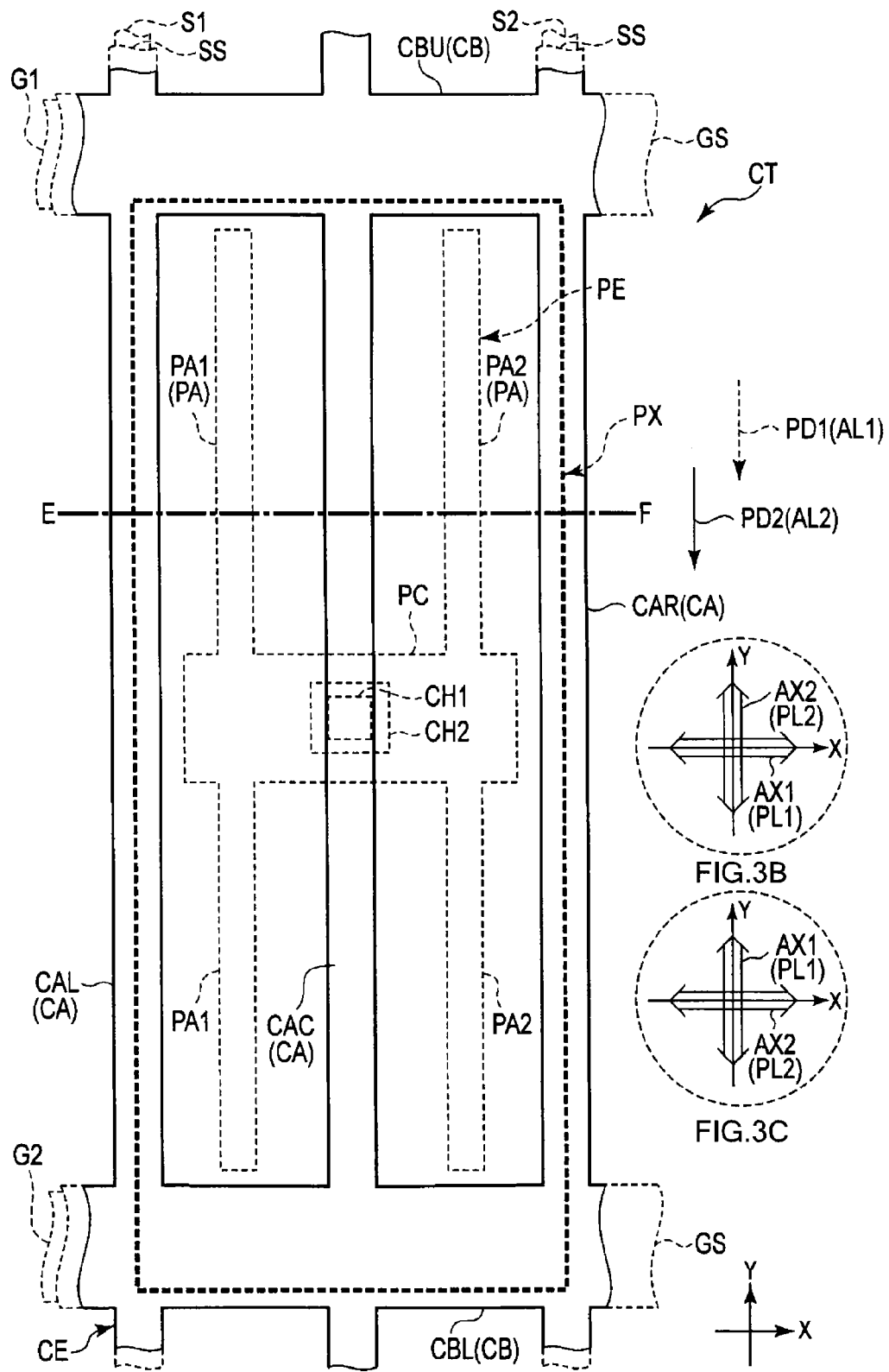
FIG. 3A is a plan view schematically showing a structure of one pixel in a counter substrate shown in FIG. 1.

FIG. 3A is a plan view schematically showing a structure of one pixel PX in the counter substrate CT shown in FIG. 1. Here, the plan view in the X-Y plane is shown. In addition, only structure required for explanation is illustrated. The pixel electrode PE, the gate shield electrode GS, the source shield electrode SS, etc., formed on the array substrate are shown with a dashed line.

The counter substrate CT is equipped with the common electrode CE and the second alignment film AL2, etc.

The common electrode CE is equipped with a plurality of main-common electrodes CA and sub-common electrodes CB. The main-common electrode CA and the sub-common electrode CB are integrally or continuously formed, and electrically connected mutually. However, the sub-common electrode CB may be omitted. The common electrode CE is equipped with a main-common electrode CAL, a main-common electrode CAR, a main-common electrode CAC, a sub-common electrode CBU, and a sub-common electrode CBL in this embodiment. As above-mentioned, the common electrode CE is electrically connected with the electric supply portion VS, and electrically connected also with the gate shield electrode GS and the source shield electrode SS. The common electrodes CE is set to the same potential as the potential of the gate shield electrode GS and the source shield electrode SS.

In illustrated pixel PX, the main-common electrode CAL is arranged at the left-hand side end, the main-common electrode CAR is arranged at the right-hand side end, and the main-common electrode CAC is arranged in the central portion of the pixel PX. Strictly, the main-common electrode CAL is arranged striding over a boundary between the illustrated pixel PX and a pixel adjoining on its left-hand side, the main-common electrode CAR is arranged striding over a boundary between the illustrated pixel and a pixel adjoining on its right-hand side, and the main-common electrode CAC is arranged in the middle between the main-common electrode CAL and the main-common electrode CAR. The sub-common electrode CBU is arranged at the upper portion end, and the sub-common electrode CBL is arranged at the bottom end portion. Strictly, the sub-common electrode CBU is arranged striding over a boundary between the illustrated pixel and a pixel adjoining its upper portion, and the sub-common electrode CBL is arranged striding over a boundary between the illustrated pixel and a pixel adjoining its bottom portion.

That is, three main-common electrodes CA are arranged in the same pitch in each pixel along the first direction X. The main-common electrodes CA are formed in the shape of a stripe which has substantially constant width along the first direction X, and linearly extend along the second direction Y. Moreover, two sub-common electrodes CB are arranged in each pixel PX. The sub-common electrodes CB are formed in the shape of a stripe which has substantially constant width along the second direction Y, and linearly extend along the first direction X.

The main-common electrode CAL is located above the source shield electrode SS facing the source line S1. The main-common electrode CAR is located above the source shield electrode SS facing the source line S2. The main-common electrode CAC is located between the main pixel electrode PA1 and the main pixel electrode PA2 passing above the contact holes CH 1 and CH2.

In the X-Y plane, the main-common electrode CAL and the main-common electrode CAC are located on the both sides sandwiching the main pixel electrode PA1. The main-common electrode CAC and the main-common electrode CAR are located on the both sides sandwiching the main pixel electrode PA2. The main pixel electrode PA1 and the main pixel electrode PA2 are located on the both sides sandwiching the main-common electrode CAC.

That is, in the X-Y plane, the main-common electrode CA and the main pixel electrode PA are located by turns along the first direction X. In this embodiment, the main-common electrode CAL, the main pixel electrode PA1, the main-common electrode CAC, the main pixel electrode PA2, and the main-common electrode CAR are located with this order. The inter-electrode distance between the main pixel electrode PA1 and the main-common electrode CAC in the first direction X is the same as the distance between the main-common electrode CAC and main pixel electrode PA2. The inter-electrode distance between the main-common electrode CAL and main pixel electrode PA1 in the first direction X is substantially the same as the inter-electrode portion between the main pixel electrode PA2 and the main-common electrode CAR. In addition, the inter-electrode distance between the main-common electrode CAL and main pixel electrode PA1, the inter-electrode distance between main pixel electrode PA1 and the main-common electrode CAC, the inter-electrode distance between the main-common electrode CAC and the main pixel electrode PA2, and the inter-electrode distance between main pixel electrode PA2 and the main-common electrode CAR may be substantially the same.

The sub-common electrode CBU is located above the gate shield electrode GS facing the gate line G1. The sub-common electrode CBL is located above the gate shield electrode GS facing the gate line G2. In the X-Y plane, the sub-common electrode CBU and the sub-common electrode CBL are located on the both sides sandwiching the pixel electrode PE. The main-common electrode CA and the sub-common electrode CB are connected mutually, and form the shape of a lattice.

The second alignment film AL2 covers the common electrode CE. In order to initially align the liquid crystal molecule of the liquid crystal layer LQ, alignment treatment is carried out to the second alignment film AL2 along with a second alignment treatment direction PD2. The second alignment treatment direction PD2 is in parallel to the first alignment treatment direction PD1 each other and same directions or opposite directions to the first alignment treatment direction PD1. In the illustrated embodiment, the second alignment treatment direction PD2 is in parallel to the second direction Y, and same directions as the first alignment treatment direction PD1.

Figure 4:
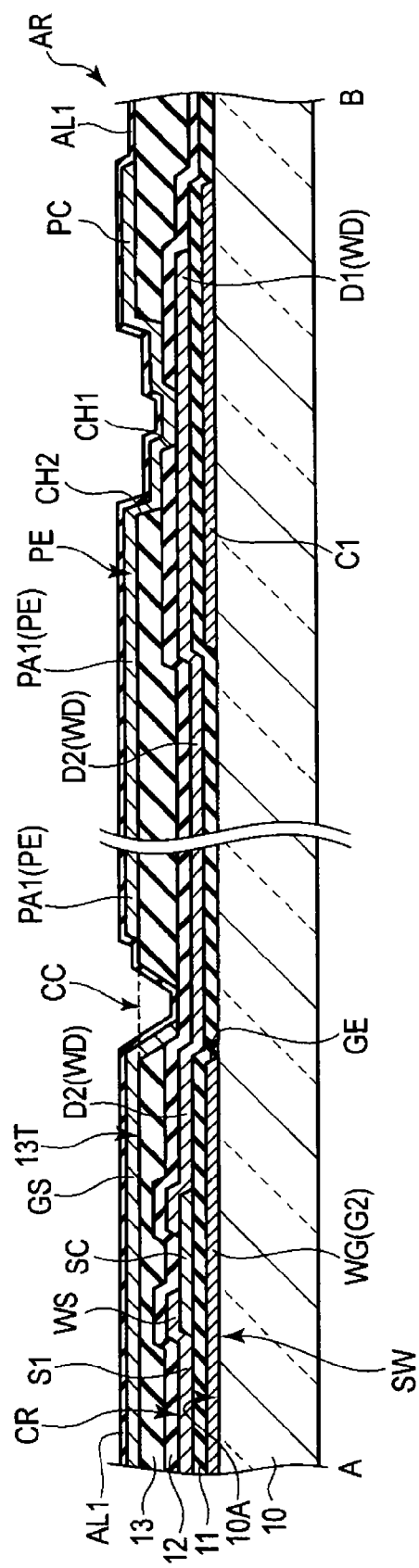
FIG. 4 is a cross-sectional view schematically showing the structure of the liquid crystal display panel taken along line A-B shown in FIG. 2.

FIG. 4 is a cross-sectional view schematically showing the structure of the liquid crystal display panel LPN taken along line A-B shown in FIG. 2.

The array substrate AR is formed using a first transparent insulating substrate 10. The array substrate AR is equipped with the switching element SW, the auxiliary capacitance line C1, the pixel electrode PE, the first insulating film 11, the second insulating film 12, the third insulating film 13, and the first alignment film AL1, etc., on the first insulating substrate 10.

The gate electrode WG is a portion of the gate line G2, and formed on the inside surface 10A of the first insulating substrate 10. The auxiliary capacitance line C1 is similarly formed on the inside surface 10A. The auxiliary capacitance line C1, the gate line G2, and the gate line G1 are formed of same wiring materials, for example. The gate electrode WG formed integrally with the gate line G2 and the auxiliary capacitance line C1 are covered with a first insulating film 11. The first insulating film 11 is also arranged on the inside surface 10A.

The semiconductor layer SC is formed on the first insulating film 11, and located right above the gate electrode WG. The source line S1, the source electrode WS, and the drain electrode WD are formed on the first insulating film 11. The source line S1 crosses the gate line G2 through the first insulating film 11. The source electrode WS is in contact with the semiconductor layer SC. A portion of the second electrode portion D2 in the drain electrode WD is in contact with the semiconductor layer SC. The second electrode portion D2 extends toward the auxiliary capacitance line C1 and is connected with the first electrode portion D1 located right above the auxiliary capacitance line C1. The first insulating film 11 is arranged between the first electrode portion D1 and the auxiliary capacitance line C1. The source line S1, the source electrode WS, the drain electrode WD, and the source line S2 are formed of the same wiring materials, for example.

The semiconductor layer SC, the source electrode WS formed integrally with the source line S1 and the drain electrode WD are covered with a second insulating film 12. That is, the second insulating film 12 covers the switching element SW. Also, the cross portion CR where the gate line G2 and the source line S1 intersects is covered with the second insulating film 12. The second insulating film 12 is formed also on the first insulating film 11. A contact hole CH1 penetrating to the drain electrode WD is formed in the second insulating film 12. The first insulating film 11 and the second insulating film 12 are formed of inorganic system materials, such as a silicon oxide (SiO) and a silicon nitride (SiN), for example.

The third insulating film 13 is arranged on the second insulating film 12. The third insulating film 13 is formed using organic system materials, such as transparent resin and has a smoothed surface. Moreover, the third insulating film 13 has film thickness larger than the first insulating film 11 and the second insulating film 12. The contact hole CH2 is formed in the third insulating film 13. The size of the contact hole CH2 is larger than the contact hole CH1. The contact hole CH1 penetrates to the drain electrode WD while the contact hole CH2 also penetrates to the second insulating film 12 around the contact hole CH1.

In the third insulating film 13, a concave portion CC is formed along an edge of the gate line G2. In this embodiment, though the concave portion CC penetrates the third insulating film 13 to the second insulating film 12, it is not always necessary that the concave portion CC penetrates to the second insulating film 12, and may be depressed from the upper surface 13T of the third insulating film 13 on which the gate shield electrode GS is arranged.

The pixel electrode PE is formed on the third insulating film 13. The main-pixel electrode PA1 counters the second electrode portion D2 through the second insulating film 12 and the third insulating film 13 in the illustrated pixel electrodes PE. The contact portion PC counters the first electrode portion D1 through the second insulating film 12 and the third insulating film 13, and is in contact with the drain electrode WD through the contact hole CH1 and the contact hole CH2. The first electrode portion D1 in the drain electrodes WD with the same potential as the pixel electrode PE counters with the auxiliary capacitance line C1 through the first insulating film 11, and forms capacitance required for the image display in the pixel PX.

Since the illustrated gate shield electrode GS is formed in the upper surface 13T of the same layer as the pixel electrode PE, i.e., the third insulating film 13, it is possible to form the gate shield electrode GS by the same electric conductive materials (ITO, etc.) as the pixel electrode PE. The gate shield electrode GS counters with the gate line G2 and extends to the concave portion CC. Moreover, in an intersection portion CR in the illustrated cross-sectional view, the second insulating film 12 and the third insulating film 13 are arranged between the source line S1 and the gate shield electrode GS.

The first alignment film AL1 covers the pixel electrode PE, the gate shield electrode GS, etc., and is arranged also on the third insulating film 13. The first alignment film AL1 is formed of the material which shows a horizontal alignment film characteristics.

Figure 5:
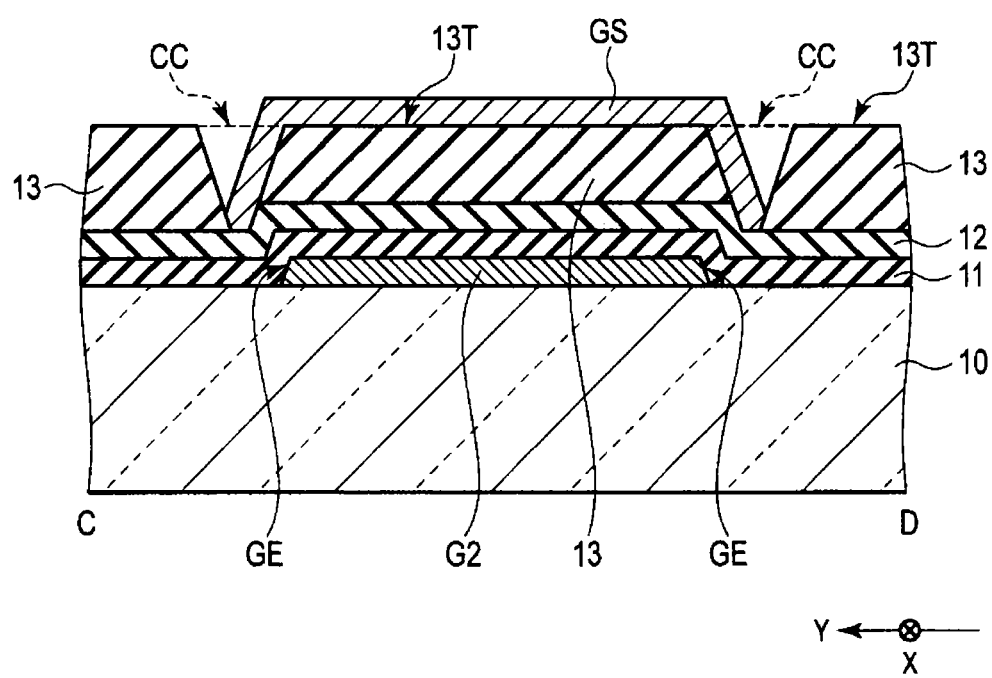
FIG. 5 is a cross-sectional view schematically showing the structure of the liquid crystal display panel taken along line C-D shown in FIG. 2.

FIG. 5 is a cross-sectional view schematically showing the structure of the liquid crystal display panel LPN taken along line C-D shown in FIG. 2. In addition, the first alignment film AL1 is omitted.

The illustrated gate shield electrode GS counters with the gate line G2. The first insulating film 11, the second insulating film 12, and the third insulating film 13 are arranged between the gate shield electrode GS and the gate line G1. The third insulating film 13 is provided with the concave portion CC located above the both side edges GE of the gate line G2. The gate shield electrode GS is formed on the upper surface of the third insulating film 13 above the gate line G2, and in a position outside the edge GE, the gate shield electrode GS extends to the concave portion CC. That is, the gate shield electrode GS more closes to the gate line G2 in the concave portion CC.

Figure 6:
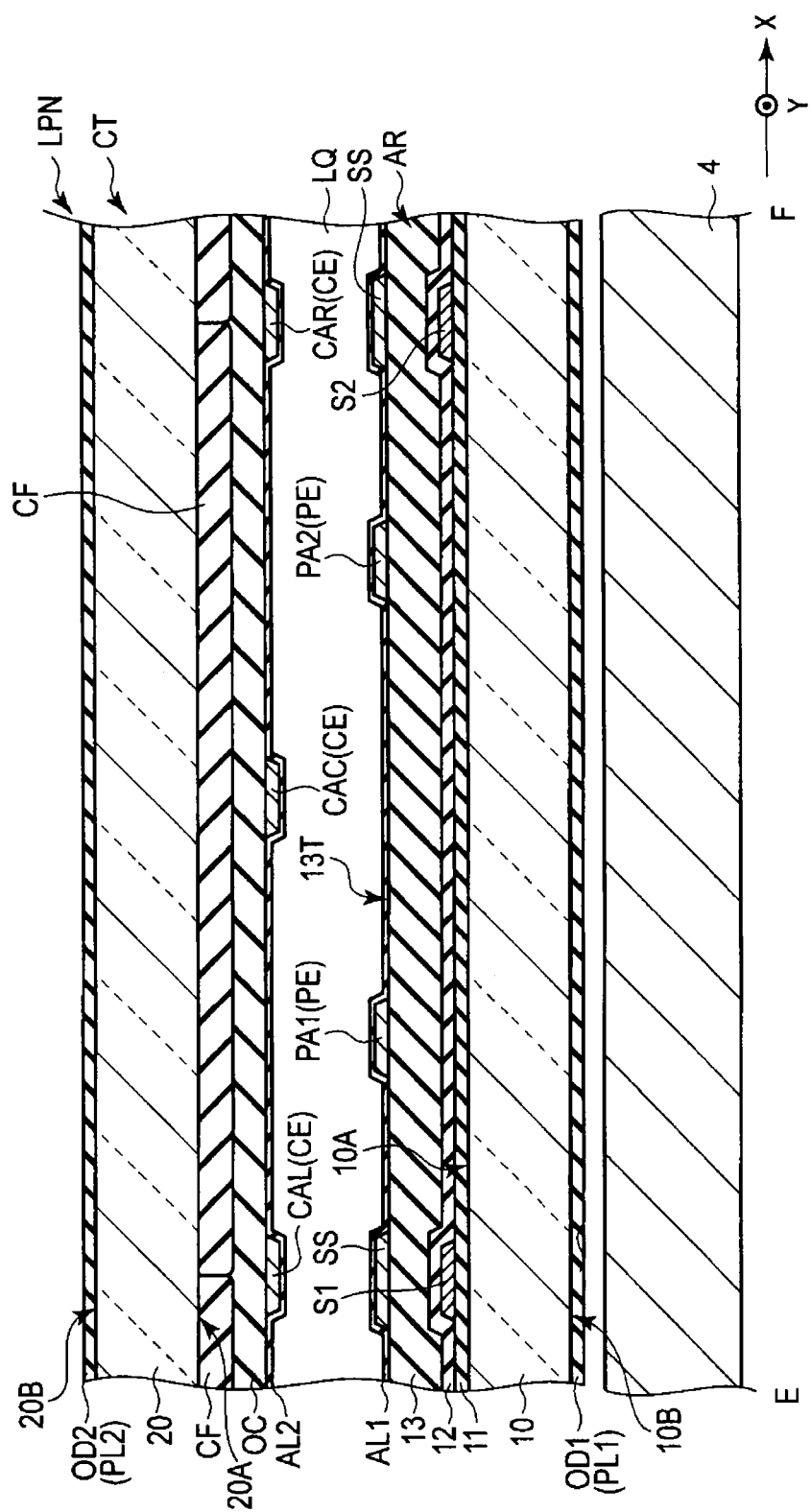
FIG. 6 is a cross-sectional view schematically showing the structure of the liquid crystal display panel taken along line E-F shown in FIG. 3.

FIG. 6 is a cross-sectional view schematically showing the structure of the liquid crystal display panel taken along line E-F shown in FIG. 3.

A backlight 4 is arranged on the back side of the array substrate AR which forms the liquid crystal display panel LPN in the illustrated example. Various types of backlights 4 can be used. For example, a light emitting diode (LED) or a cold cathode fluorescent lamp (CCFL), etc., can be applied as a light source of the backlight 4, and the explanation about its detailed structure is omitted.

The first insulating film 11 is formed in the inside surface 10A of the first insulating substrate 10 facing the counter substrate CT. The source line S1 and the source line S2 are formed on the first insulating film 11, and covered with the second insulating film 12. The pixel electrode PE and the source shield electrode SS are formed on the third insulating film 13, and covered with the first alignment film AL1. Since the source shield electrode SS is formed on the upper surface 13T of the same layer as the pixel electrode PE, i.e., the third insulating film 13, it is possible to form the source shield electrode SS by the same electric conduction materials (ITO, etc.) as the pixel electrode PE. The illustrated main-pixel electrode PA1 and the main-pixel electrode PA2 are located on the inner side rather than the position right above the source line S1 and the source line S2. The source shield electrode SS counters with the source line S1 and the source line S2, respectively. The second insulating film 12 and the third insulating film 13 are arranged between the source shield electrode SS and the source lines S1 and S2. The first alignment film AL1 is arranged on the array substrate AR facing the counter substrate CT and extends to substantially whole active area.

The counter substrate CT is formed using a second transparent insulating substrate 20. The counter substrate CT includes, a color filter CF, an overcoat layer OC, the common electrode CE, and the second alignment film AL2, etc., on the inside surface of the second insulating substrate 20 facing the array substrate AR. In addition, a black matrix to define each pixel may be arranged on the internal surface 20A of the second insulating substrate 20 facing the array substrate AR. Practically, the black matrix is arranged on the wiring portions such as the gate line, the source line, and the switching element The color filter CF is arranged corresponding to each pixel PX. That is, the color filter CF is arranged on the inside surface 20A. The colors of the color filters CF arranged in the pixels PX adjoining in the first direction X differ mutually. For example, the color filter CF is formed of resin materials colored in three primary colors of red, blue, and green. The overcoat layer OC covers the color filter CF. The overcoat layer OC is formed of, for example, organic system materials such as transparent resin, and makes the surface of the color filter CF smooth.

The common electrode CE is formed on the overcoat layer OC facing the array substrate AR and covered with the second alignment film AL2. The illustrated main-common electrode CAL is located above the source line S1 or the source shield electrode SS. The main-common electrode CAR is located above the source line S2 or the source shield electrode SS. The main-common electrode CAC is located in the center between the main-common electrode CAL and the main-common electrode CAR or the center between main pixel electrode PA1 and main pixel electrode PA2.

The region between the pixel electrode PE and the common electrode CE, i.e., the region between the main-common electrode CAL and the main pixel electrode PA1, the region between the main-common electrode CAC and the main pixel electrode PA1, the region between the main-common electrode CAC and the main pixel electrode PA2, and the region between the main-common electrode CAR and main pixel electrode PA2 correspond to penetration regions in which the backlight can penetrate.

The second alignment film AL2 is arranged on the counter substrate CT facing array substrate AR, and extends to substantially whole active area. The second alignment film AL2 is formed of the material which shows a horizontal alignment film characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The array substrate AR and the counter substrate CT are pasted together by seal material arranged in a peripheral of the active area, which is not illustrated, while the predetermined cell gap is formed, for example.

The liquid crystal layer LQ is held in a cell gap formed between the array substrate AR and the counter substrate CT, i.e., between the first alignment film AL1 and the second alignment film AL2. The liquid crystal layer LQ contains liquid crystal molecules LM. For example, the liquid crystal layer LQ is formed of liquid crystal material whose dielectric anisotropy is positive (posi-type).

In addition, the electrode interval between the main pixel electrode PA and the main-common electrode CA in the first direction X is larger than the thickness of the liquid crystal layer LQ, and has thickness more than twice the thickness of the liquid crystal layer LQ.

A first optical element OD1 is attached on an external surface 10B of the array substrate AR, i.e., the external surface of the first insulating substrate 10 which forms the array substrate AR, by adhesives, etc. The first optical element OD1 is located on a side which counters with the backlight 4 of the liquid crystal display panel LPN, and controls the polarization state of the incident light which enters into the liquid crystal display panel LPN from the backlight 4. The first optical element OD1 includes a first polarization plate PL1 having a first polarizing axis AX1. Other optical elements such as retardation film may be arranged between the first polarization plate PL1 and the first insulating substrate 10.

A second optical element OD2 is attached on an external surface 20B of the counter substrate CT, i.e., the external surface of the second insulating substrate 20 which forms the counter substrate CT, by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis AX2. Other optical elements such as retardation film may be arranged between the second polarization plate PL2 and the second insulating substrate 20.

The first polarizing axis AX1 of the first polarization plate PL1 and the second polarizing axis AX2 of the second polarization plate PL2 are arranged in the Cross Nicol relationship in which they substantially intersects perpendicularly. At this time, one polarization plate is arranged so that its polarizing axis is arranged substantially in parallel with or in orthogonal with the extending direction of the main-pixel electrode PA and the main common electrode CA. In FIG. 3B, the first polarization plate PL1 is arranged so that its first polarizing axis AX1 becomes in orthogonal with the second direction Y. The second polarization plate PL2 is arranged so that its second polarizing axis AX2 becomes in parallel to the second direction Y. Furthermore, in FIG. 3C, the second polarization plate PL2 is arranged so that its second polarizing axis AX2 becomes in orthogonal with the second direction Y. The first polarization plate PL1 is arranged so that its first polarizing axis AX1 becomes in parallel to the second direction Y.

Next, operation of the liquid crystal display panel LPN of the above-mentioned structure is explained referring to FIG. 2 to FIG. 6.

At the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axes are aligned in a parallel direction with the first alignment treatment direction PD1 of the first alignment film AL1 and the second alignment treatment direction PD2 of the second alignment film AL2. In this state, the time of OFF corresponds to the initial alignment state, and the alignment direction of the liquid crystal molecule LM corresponds to the initial alignment direction. Here, the first alignment treatment direction PD1 and the second alignment treatment direction PD2 are substantially in parallel with the second direction Y and same directions each other. At the time OFF, the liquid crystal molecules LM are aligned so that their long axes are aligned in parallel to the second direction Y in the X-Y plane.

At the time of OFF, a portion of the backlight from the backlight 4 penetrates the first polarization plate PL1, and enters into the liquid crystal display panel LPN. The backlight which entered into the liquid crystal display panel LPN is linearly polarized light which intersects perpendicularly with the first polarizing axis AX1 of the first polarization plate PL1. The polarization state of the linearly polarized light does hardly change when the backlight passes the liquid crystal layer LQ at the time OFF. For this reason, the linearly polarized light which penetrates the liquid crystal display panel LPN is absorbed by the second polarization plate PL2 which is arranged in the Cross Nicol positional relationship with the first polarization plate PL1 (black display).

On the other hand, in case the potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the alignment state changes. That is, the alignment direction of the liquid crystal molecule LM is divided into a plurality of directions bordering on the position which overlaps with the main pixel electrode PA or the main-common electrode CA, and a domain corresponding to each alignment direction is formed. That is, a plurality of domains is formed in one PX.

At the time of ON, the polarization state of the linearly polarized backlight entered in the liquid crystal panel LPN changes in accordance with the alignment state of the liquid crystal molecule LM when the backlight passes the liquid crystal layer LQ held between the main pixel electrode PA and the main-common electrode CA. Thereby, the polarization state of at least a portion of the backlight which passed the liquid crystal layer LQ becomes a linearly polarized light in parallel to the second direction Y. For this reason, at the time of ON, at least a portion of the backlight which passed the liquid crystal layer LQ penetrates the second polarization plate PL2 (white display). However, in the position which overlaps with the pixel electrode or the common electrode, since the liquid crystal molecule maintains the initial alignment state, it becomes a black display like the time of OFF.

According to this embodiment, the array substrate AR is equipped with the gate shield electrode GS facing the gate line G. In the interlayer insulating film arranged between the gate line G and the gate shield electrode GS, the concave portion CC is formed along with the edge GE of the gate line G. Further, the gate shield electrode GS extends to the concave portion CC. That is, since the gate shield electrode GS is arranged so as to close to the edge GE of the gate line G, it becomes possible to shield undesirable electric field from near the edge GE of the gate line G. For this reason, it becomes possible to control impression of undesirable bias from the gate line G to the liquid crystal layer LQ. Therefore, it becomes possible to suppress degradation of display grace such as burn-in phenomenon, and further to control generating of the optical leak due to the alignment defect of the liquid crystal molecule under the influence of leaked electric field from the gate line G in the case of a black display. Accordingly, it becomes possible to control the fall of a contrast ratio.

Moreover, since the concave portion CC is broken off at an intersection portion CR in which the gate line G and source line S intersect, the second insulating film 12 and the third insulating film 13 are arranged between the source line S and the gate shield electrode GS in the intersection portion CR. For this reason, it becomes possible to control formation of the undesirable capacitance due to close arrangement of the source line S and the gate shield electrode GS.

Since the concave portion CC penetrates to the second insulating film 12, it becomes possible to arrange the gate shield electrode GS more close to the gate line G, and to improve an electric field shielding effect.

Moreover, since the concave portion CC is formed in the shape of a slit along with the edges GE of the both sides of the gate line G, it becomes possible to make small the width of concave portion CC in the second direction Y, and to control the alignment defect of the liquid crystal molecule due to unevenness of the surface of the third insulating film 13.

Moreover, since the array substrate AR is equipped with the source shield electrode SS facing the source line S, it becomes possible to shield undesirable electric field from the source line S. For this reason, it becomes possible to control that undesirable bias is impressed from the source line S to the liquid crystal layer LQ, and also to control degradation of display grace such as the cross talk.

Moreover, since the gate shield electrode GS and the source shield electrode SS are electrically connected in the array substrate AR, and the main-common electrode CA and the sub-common electrode CB are electrically connected mutually in the counter substrate CT, it becomes possible to raise redundancy. That is, even if disconnection occurs in a portion of the gate shield electrodes GS, the source shield electrodes SS, the main-common electrodes CA and the sub-common electrodes CB, it becomes possible to stably supply common potential to each pixel PX, and to control degradation of display grace.

In addition, although the initial alignment direction is set in parallel to the second direction Y in the above-mentioned embodiment, the initial alignment direction may be set to an oblique direction crossing the first direction X and the second direction Y.

Moreover, the above embodiment explains about the case in which the liquid crystal layer LQ is formed of the liquid crystal material which has positive (positive type) dielectric constant anisotropy. However, the liquid crystal material having negative dielectric constant anisotropy (negative type) may be used.

Furthermore, although the above embodiment explains about the case in which the pixel electrode PE includes two main pixel electrodes PA, the structure is not limited to this embodiment. When the number of the main pixel electrodes PA with which each pixel electrode PE is equipped is set to "a", the number of the main-common electrodes CA arranged in each pixel PX becomes (a+1). One main pixel electrode PA is arranged between the adjoining main-common electrodes CA (here "a" equals to 1 or larger positive numbers).

In addition, the structure of pixel PX is not limited to the above-mentioned example in this embodiment.

Figure 7:
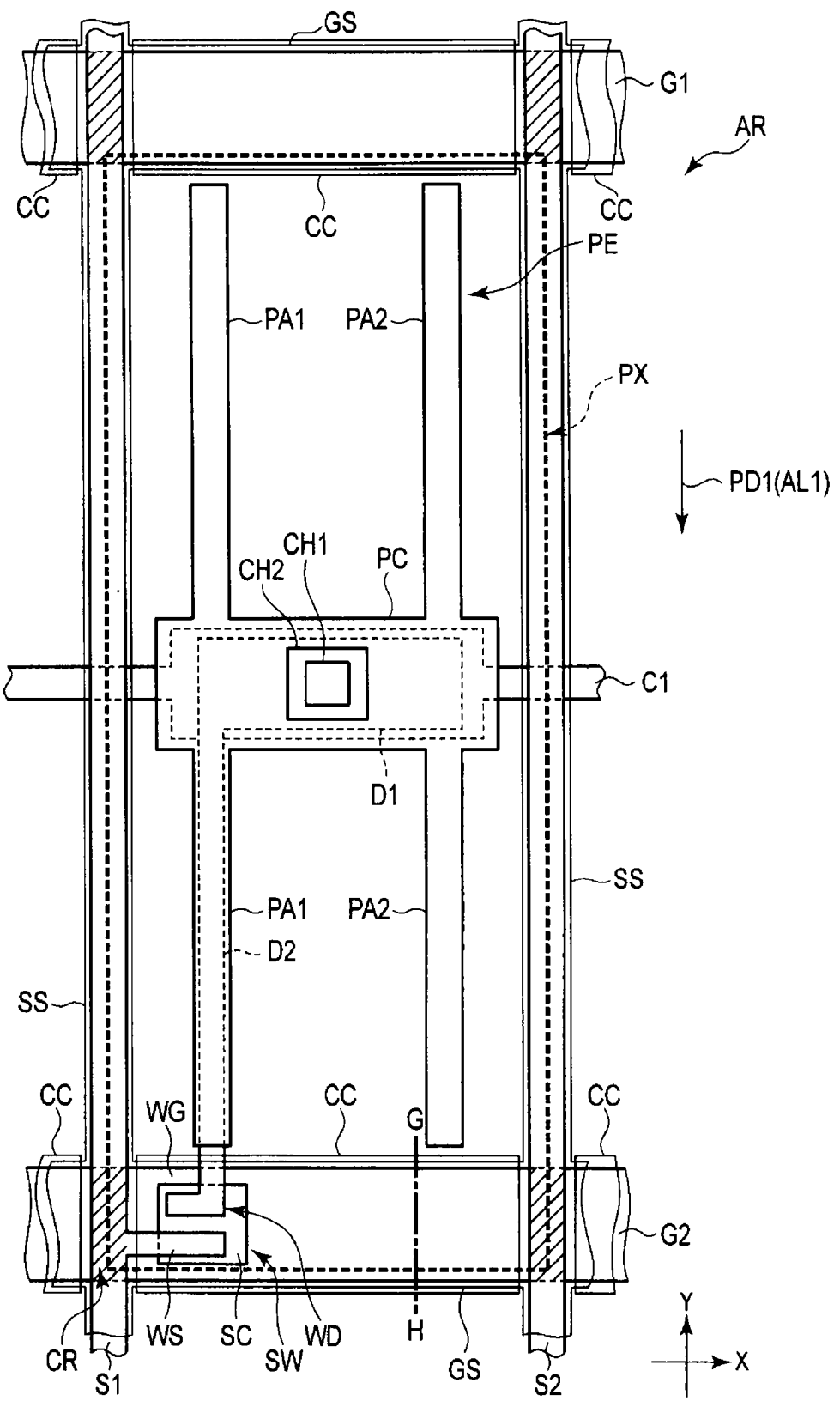
FIG. 7 is a plan view schematically showing the structure of one pixel when the array substrate shown in FIG. 1 is seen from the counter substrate side according to a second embodiment.

FIG. 7 is a plan view schematically showing a structure of one pixel when the array substrate AR shown in FIG. 1 is seen from the counter substrate side according to a second embodiment.

The second embodiment shown in FIG. 7 is different as compared with the first embodiment shown in FIG. 2 in that the concave portion CC is formed over an area facing the gate line G. That is, the concave portion CC extends not only above the both side edges GE of the gate line G but the upper portion between the both edges. In a X-Y plane, the concave portion CC counters with the gate line G between the adjoining source line S1 and the source line S2. The concave portion CC extends not only on the gate line G but the switching element SW in the first direction. Moreover, although the concave portion CC is broken off at the intersection portion CR, the concave portion CC does not necessarily need to be broken off, and may be formed continuously over the plurality of pixels.

Figure 8:
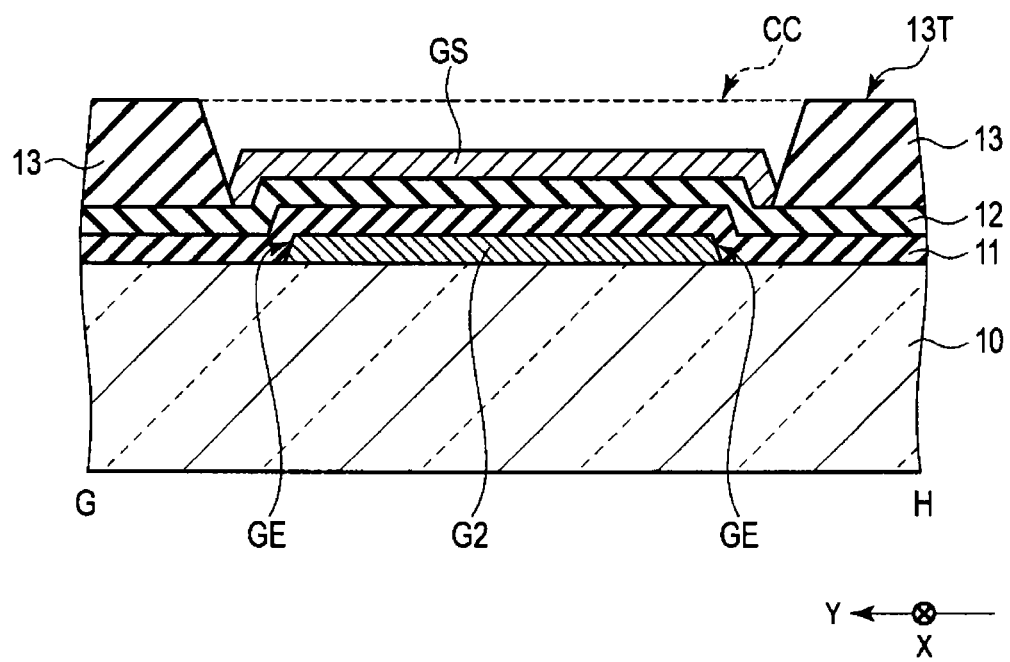
FIG. 8 is a cross-sectional view schematically showing the structure of the array substrate taken along line G-H shown in FIG. 7.

FIG. 8 is a view schematically showing a cross-sectional structure of the array substrate AR taken along line G-H in FIG. 7. In addition, the first alignment film is omitted.

The illustrated gate shield electrode GS counters with the gate line G2. The third insulating film 13 is equipped with the concave portion CC located above the gate line G2. In this embodiment, although the concave portion CC penetrates the third insulating film 13 to the second insulating film 12, the concave portion CC does not necessarily need to penetrate to the second insulating film 12, and may be depressed from the upper surface 13T in the third insulating film 13. The gate shield electrode GS is formed in the concave portion CC above the gate line G2. The first insulating film 11 and the second insulating film 12 are arranged between the gate shield electrode GS and the gate line G2. For this reason, as compared with the embodiment shown in FIG. 5, it becomes possible that the gate shield electrode GS shields the undesirable electric field from the gate line G in the concave portion CC in the position more close to the gate line G.

It is possible to combine the counter substrate CT equipped with the common electrode CE shown in FIG. 3 with the above array substrate AR.

As explained above, according to the embodiments, it becomes possible to supply the liquid crystal display device which can control degradation of display grace.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device, comprising:
a first substrate including:
a gate line extending in a first direction,
a first insulating film covering the gate line,
a source line arranged on the first insulating film and extending in a second direction crossing the first direction,
a switching element electrically connected with the gate line and the source line, a second insulating film covering the source line and the switching element and arranged on the first insulating film, a third insulating film arranged on the second insulating film and including a concave portion extending along an edge of the gate line in the first direction, a pixel electrode located on the third insulating film, and including a contact portion contacting with the switching element extending in the first direction and a main pixel electrode connected with the contact portion and extending in the second direction, a gate shield electrode arranged on the third insulating film above the gate line and extending in the first direction, the gate shield electrode extending in the concave portion formed in the third insulating film along the edge of the gate line in the first direction, and a source shield electrode electrically connected with the gate shield electrode on the third insulating film and arranged above the source line to extend in the second direction;

a second substrate including a common electrode with the same potential as the gate shield electrode and the source shield electrode, the common electrode being provided with a sub-common electrode located above the gate shield layer and extending in the first direction, and a main-common electrode connected with the sub-common electrode and arranged above the source shield electrode to extend in the second direction; and a liquid crystal layer held between the first substrate and the second substrate.

2. The liquid crystal display device according to claim 1, wherein the concave portion is broken off at an intersection position where the gate line intersects with the source line, and the second and third insulating films are arranged between the source line and the gate shield electrode.

3. The liquid crystal display device according to claim 1, wherein the concave portion penetrates to the second insulating film.

4. The liquid crystal display device according to claim 1, wherein the gate shield electrode and the source shield electrode are formed of the same material as the pixel electrode.

5. The liquid crystal display device according to claim 1, wherein the concave portion is formed along both edges of the gate line, respectively.

6. The liquid crystal display device according to claim 5, wherein the concave portion is formed in a slit shape.

7. A liquid crystal display device, comprising:
a first substrate including:
a gate line extending in a first direction,
a first insulating film covering the gate line,
a source line arranged on the first insulating film and extending in a second direction crossing the first direction, a switching element electrically connected with the gate line and the source line, a second insulating film covering the source line and the switching element and arranged on the first insulating film, a third insulating film formed on the second insulating film and including a concave portion, the concave portion including a first region facing a surface of the gate line and a second region extending along an edge of the gate line in the first direction, a pixel electrode located on the third insulating film, and including a contact portion contacting with the switching element extending in the first direction and a main pixel electrode connected with the contact portion and extending in the second direction, a gate shield electrode arranged on the third insulating film above the gate line and extending in the first direction, the gate shield electrode extending on the first region of the concave portion facing the surface of the gate line and the second region of the concave portion extending along the edge of the gate line in the first direction, and a source shield electrode electrically connected with the gate shield electrode on the third insulating film and arranged above the source line to extend in the second direction;

a second substrate including a common electrode with same potential as the gate shield electrode and the source shield electrode, the common electrode being provided with a sub-common electrode located above the gate shield layer and extending in the first direction and a main-common electrode connected with the sub-common electrode and arranged above the source shield electrode to extend in the second direction; and a liquid crystal layer held between the first substrate and the second substrate.

8. The liquid crystal display device according to claim 7, wherein the concave portion is broken off in an intersection position where the gate line intersects with the source line, and the first and second insulating films are arranged between the gate shield electrode and the gate line.

9. The liquid crystal display device according to claim 7, wherein the concave portion penetrates to the second insulating film.

10. The liquid crystal display device according to claim 7, wherein the gate shield electrode and the source shield electrode are formed of the same material as the pixel electrode.

* * * * *